United States Patent Office 3,499,080
Patented Mar. 3, 1970

3,499,080
ANTIBACTERIAL METHODS AND COMPOSITIONS UTILIZING N' - (4 - PYRIMIDINYL)-SULFANILAMIDES
Markus Zimmermann, Riehen, Switzerland, assignor to Geigy Chemical Corporation, Ardsley, N.Y., a corporation of New York
No Drawing. Continuation-in-part of application Ser. No. 622,900, Mar. 14, 1967. This application Jan. 22, 1969, Ser. No. 793,192
Claims priority, application Switzerland, Oct. 15, 1964, 13,410/64; Sept. 15, 1965, 12,816/65; Mar. 17, 1966, 3,990/66
Int. Cl. A61k 27/00
U.S. Cl. 424—229
10 Claims

ABSTRACT OF THE DISCLOSURE

Antibacterial method and compositions utilizing an $N^1$-(4-pyrimidinyl)-sulfanilamide having a cyclopropyl group in the 2-, 5- or 6-position of the pyrimidine ring.

CROSS REFERENCE

This is a continuation-in-part of Ser. No. 622,900 filed Mar. 14, 1967 which in turn is a continuation-in-part of Ser. No. 492,925 filed Oct. 4, 1965, now abandoned.

DETAILED DESCRIPTION

The present invention pertains to a method of treating Gram positive and Gram negative infections, and to compositions useful in the execution of that method, through the administration of an antibacterially effective amounts of a compound of the formula:

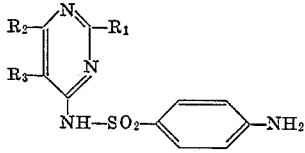

(I)

wherein:

one and only one of $R_1$, $R_2$ and $R_3$ is cyclopropyl; each of $R_1$ and $R_2$ when other than cyclopropyl, is hydrogen, lower alkyl, lower alkoxy, lower alkylthio or halogen; and $R_3$ when other than cyclopropyl is hydrogen, lower alkyl, lower alkoxy or halogen, or a pharmaceutically acceptable non-toxic salt thereof.

These compounds and their synthesis are described in detail in copending application Serial No. 622,900 and those descriptions are incorporated by reference in the present specification. Typical of such compounds are:

$N^1$-(6-cyclopropyl-4-pyrimidinyl)-sulfanilamide, M.P. 205–207° C.
$N^1$-(6-cyclopropyl-2-methyl-4-pyrimidinyl)-sulfanilamide, M.P. 166–167° C.
$N^1$-(6-cyclopropyl-2-methylthio-4-pyrimidinyl)-sulfanilamide, M.P. 163–165° C.
$N^1$-(6-cyclopropyl-2-methoxy-4-pyrimidinyl)-sulfanilamide, M.P. 147–149° C.
$N^1$-(2-cyclopropyl-6-chloro-4-pyrimidinyl)-sulfanilamide, M.P. 162–162° C.
$N^1$-(2-cyclopropyl-4-pyrimidinyl)-sulfanilamide, M.P. 193–194° C.
$N^1$-(2-cyclopropyl-6-methoxy-4-pyrimidinyl)-sulfanilamide, M.P. 168–170° C.
$N^1$-(2-cyclopropyl-6-methyl-4-pyrimidinyl)-sulfanilamide, M.P. 180–182° C.
$N^1$-(6-cyclopropyl-2-propoxy-4-pyrimidinyl)-sulfanilamide, M.P. 129–131° C.
$N^1$-(5-cyclopropyl-6-chloro-4-pyrimidinyl)-sulfanilamide, M.P. 179–180° C.
$N^1$-(5-cyclopropyl-6-methoxy-4-pyrimidinyl)-sulfanilamide, M.P. 182–184° C.
$N^1$-(5-methoxy-6-cyclopropyl-4-pyrimidinyl)-sulfanilamide, M.P. 201–203° C.
$N^1$-(5-methyl-6-cyclopropyl-4-pyrimidinyl)-sulfanilamide, M.P. 229–232° C.
$N^1$-(2,5-dimethyl-6-cyclopropyl-4-pyrimidinyl)-sulfanilamide, M.P. 185–187° C.
$N^1$-(2-methoxy-5-methyl-6-cyclopropyl-4-pyrimidinyl)-sulfanilamide, M.P. 213–214° C.
$N^1$-(5-chloro-6-cyclopropyl-4-pyrimidinyl)-sulfanilamide, M.P. 202–203° C, and
$N^1$-(2-cyclopropyl-5-methyl-6-methylthio-4-pyrimidinyl)-sulfanilamide, M.P. 229–230° C.

Gram positive infections such as those caused by staphylococci, streptococci, pneumococci and the like, and Gram negative infections such as those caused by Salmonella typhi, Escheria coli, Klebsiella pneumoniae and the like in adult mammals, including animals and humans, are treated by administering an antibacterially effective amount of a compound according to Formula I or a salt thereof. While, as with all sulfanilamides, the actual dose is that which cures the patient, i.e., the dose must be titrated to the patient, his species, his overall condition and the severity of the infection, generally the dose for an adult mammal will be from about 1 to about 100 mg./kg.

The $N^1$-(cyclopropyl-4-pyrimidinyl)-sulfanilamides of Formula I are administered parenterally or orally in accordance with the present invention to achieve an antibacterial effect in any of a number of pharmaceutical forms. These include solid and liquid unit dosage forms for oral administration such as tablets, capsules, powders, suspensions, solutions, syrups and the like, including sustained release preparations, and fluid injectable forms such as sterile aqueous solutions and suspensions. The term unit dosage form as used in this specification and the claims refers to physically discrete units to be administered in single or multiple dosage to animals, each unit containing a predetermined quantity of active material in association with the required diluent, carrier or vehicle. The quantity of active material is that calculated to produce the desired antibacterial effect upon administration of one or more of such units.

Powders are prepared by comminuting the compound to a suitably fine size and mixing with a similarly comminuted diluent pharmaceutical carrier such as an edible carbohydrate material as for example, starch. A sweetening agent or flavoring oil can also be present.

Capsules are made by preparing a powder mixture as described above and filling formed gelatin sheaths. A lubricant such as talc, magnesium stearate and calcium stearate can be added to the powder mixture as an adjuvant before the filling operation.

Tablets are made by preparing a powder mixture, granulating or slugging, adding a lubricant and pressing into tablets. The powder mixture is prepared by mixing the compound, suitably comminuted, with a diluent or base such as starch, sucrose, kaolin, dicalcium phosphate and the like. The powder mixture can be granulated by wetting with a binder such as syrup, starch paste or acacia mucilage and forcing through a screen. As an alternative, to granulating, the powder mixture can be run through the tablet machine and the resulting imperfectly formed tablets broken into slugs. The slugs can be lubricated to prevent sticking to the tablet forming dies by means of the addition of stearic acid, a stearate salt, talc or mineral oil. The lubricating mixture is then compressed into tablets. A protective coating consisting of a sealing coat of shellac, a coating of sugar and methylcellulose, and a polish coating of wax can be provided. Dyestuffs can be added to these coatings to distinguish different unit dosages. A typical preparation of such tablets are as follows:

One hundred thousand kilograms of $N^1$-(5-methoxy-6-cyclopropyl-4-pyrimidinyl)-sulfanilamide are mixed with 13,000 kg. of dry corn starch and 13,000 kg. of lactose. The mass obtained is mixed with 3,000 kg. of glycerol and 5,000 kg. of gelatin in distilled water, whereupon this mass is kneaded for 20 minutes. As soon as it is evenly moistened, it is granulated through a sieve (25 mesh/sq. cm.) and dried. The dried granulates are sieved again (60 mesh/sq. cm.) and then mixed for one hour with 7,500 kg. of potato starch, 7,500 kg. of talcum and 1,000 kg. of magnesium stearate. The mass obtained is pressed into 1,000,000 tablets each weighing 150 mg. and containing 100 mg. of active substance.

In a like manner, tablets may be prepared utilizing other of the sulfanilamides described above, e.g., $N^1$-(6-cyclopropyl-4-pyrimidinyl)-sulfanilamide, $N^1$-(2-cyclopropyl-4-pyrimidinyl)-sulfanilamide and the like.

Oral fluids such as syrups and elixirs can be prepared in unit dosage form so that a given quantity, e.g., a teaspoonful, contains a predetermined amount of the compound. Syrups can be prepared by suspending the compound in a suitably flavored aqueous sucrose solution while elixirs are prepared through the use of a non-toxic alcoholic vehicle.

For parenteral administration, fluid unit dosage forms can be prepared by suspending or dissolving a measured amount of the compound in a non-toxic liquid vehicle suitable for injection such as an aqueous or oleaginous medium. Alternatively a measured amount of the compound is placed in a vial and the vial and its contents is sterilized and sealed. An accompanying vial of vehicle can be provided for mixing prior to administration.

One important embodiment of the present invention is the pharmaceutically acceptable non-toxic salts of sodium, potassium, calcium and organic amines. Such amines include ethylamine, diethylamine, diethylaminoethanol, morpholine, ethylenediamine, aminoethanol, dimethylamine, diethanolamine, triethanolamine and the like.

A particularly useful aspect of the present invention are the methods and compositions utilizing the compounds of Formula I wherein one of $R_1$ and $R_2$ is cyclopropyl, the other of $R_1$ and $R_2$ is hydrogen, methyl or methoxy and $R_3$ is hydrogen or methyl, and the salts thereof.

What is claimed is:

1. A method of treating Gram positive and Gram negative infections in mammal which comprises administering to the mammal an antibacterially effective amount of a compound of the formula:

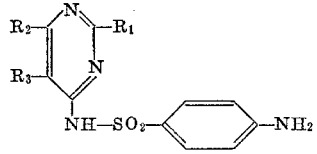

wherein
one and only one of $R_1$, $R_2$ and $R_3$ is cyclopropyl;
each of $R_1$ and $R_2$, when other than cyclopropyl, is hydrogen, lower alkyl, lower alkoxy, lower alkylthio or halogen; and
$R_3$ when other than cyclopropyl is hydrogen, lower alkyl, lower alkoxy or halogen,
or a pharmaceutically acceptable non-toxic salt thereof.

2. The method of claim 1 wherein one of $R_1$ and $R_2$ is cyclopropyl, the other of $R_1$ and $R_2$ is hydrogen, methyl or methoxy and $R_3$ is hydrogen or methoxy.

3. The method of claim 1 wherein the compound is $N^1$-(6-cyclopropyl-4-pyrimidinyl)-sulfanilamide.

4. The method of claim 1 wherein the compound is $N^1$-(5-methoxy-6-cyclopropyl-4-pyrimidinyl)-sulfanilamide.

5. The method of claim 1 wherein the compound is $N^1$-(2-cyclopropyl-4-pyrimidinyl)-sulfanilamide.

6. An antibacterial pharmaceutical composition comprising an antibacterially effective amount of a compound of the formula:

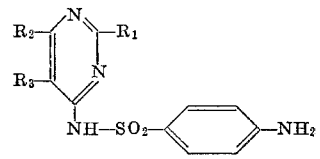

wherein
one and only one of $R_1$, $R_2$ and $R_3$ is cyclopropyl;
each of $R_1$ and $R_2$, when other than cyclopropyl, is hydrogen, lower alkyl, lower alkoxy, lower alkylthio or halogen; and
$R_3$ when other than cyclopropyl is hydrogen, lower alkyl, lower alkoxy or halogen,
or a pharmaceutically acceptable non-toxic salt thereof and a pharmaceutical carrier.

7. An antibacterial composition according to claim 6 wherein one of $R_1$ and $R_2$ is cyclopropyl, the other of $R_1$ and $R_2$ is hydrogen, methyl or methoxy and $R_3$ is hydrogen or methoxy.

8. An antibacterial composition according to claim 6 wherein the compound is $N^1$-(6-cyclopropyl-4-pyrimidinyl)-sulfanilamide.

9. An antibacterial composition according to claim 6 wherein the compound is $N^1$-(5-methoxy-6-cyclopropyl-4-pyrimidinyl)-sulfanilamide.

10. An antibacterial composition according to claim 6 wherein the compound is $N^1$-(2-cyclopropyl-4-pyrimidinyl)-sulfanilamide.

References Cited

UNITED STATES PATENTS 2,407,966   9/1946   Sprague _____ 260—239.75

ALBERT T. MEYERS, Primary Examiner
JEROME D. GOLDBERG, Assistant Examiner